US009662518B1

(12) United States Patent
Lay

(10) Patent No.: US 9,662,518 B1
(45) Date of Patent: May 30, 2017

(54) REMOTELY OPERABLE PERSONAL FALL ARRESTMENT DEVICE AND APPARATUS

(71) Applicant: Craig D. Lay, Rialto, CA (US)

(72) Inventor: Craig D. Lay, Rialto, CA (US)

(\*) Notice: Subject to any disclaimer, the term of this patent is extended or adjusted under 35 U.S.C. 154(b) by 125 days.

(21) Appl. No.: 14/594,146

(22) Filed: Jan. 11, 2015

Related U.S. Application Data

(60) Provisional application No. 61/929,065, filed on Jan. 19, 2014.

(51) Int. Cl.
*F16B 45/02* (2006.01)
*A62B 35/00* (2006.01)
*B63B 21/54* (2006.01)

(52) U.S. Cl.
CPC .......... *A62B 35/0068* (2013.01); *B63B 21/54* (2013.01); *F16B 45/025* (2013.01)

(58) Field of Classification Search
CPC .... F16B 45/025; B63B 21/54; A62B 35/0068
See application file for complete search history.

(56) References Cited

U.S. PATENT DOCUMENTS

| | | | | |
|---|---|---|---|---|
| 2,116,880 A * | 5/1938 | Dee | .......................... | B63B 21/54 114/221 R |
| 2,730,985 A * | 1/1956 | Wingate | ................... | B63B 21/54 114/221 R |
| 3,013,517 A * | 12/1961 | Isham | ...................... | B63B 21/54 114/221 R |
| 3,014,257 A * | 12/1961 | Huffman | ................ | F16B 45/025 24/598.5 |
| 3,591,226 A * | 7/1971 | Elmore, Jr. | ................. | B25J 1/04 223/119 |
| 4,595,223 A * | 6/1986 | Hawie | ......................... | B25J 1/04 294/175 |
| 4,751,892 A * | 6/1988 | Sechel | ..................... | B63B 21/00 114/221 R |
| 4,793,646 A * | 12/1988 | Michaud, Jr. | ........... | B63B 21/54 114/221 R |
| 6,363,876 B1 * | 4/2002 | Blake | ...................... | B63B 22/02 114/221 R |

(Continued)

FOREIGN PATENT DOCUMENTS

| | | | | |
|---|---|---|---|---|
| FR | 2585664 A1 * | 2/1987 | ............. | B63B 21/54 |
| FR | 2720130 A1 * | 11/1995 | ............. | B63B 21/54 |
| WO | WO 9202406 A1 * | 2/1992 | ............. | B63B 21/54 |

*Primary Examiner* — Colleen M Chavchavadze
(74) *Attorney, Agent, or Firm* — William L. Chapin

(57) ABSTRACT

A remotely attachable personal fall arrestment apparatus includes a self-retracting lanyard (SRL) having an upwardly protruding carabineer connector ring which has a gate link that is pivotable open to expose a downwardly protruding upper front hook link which is attachable to an anchor member such as a rebar or bolt eye located above a work site, and a lifeline retractably extendable downwardly from the SRL and releasably attachable to a safety body-harness worn by a worker The apparatus includes an SRL remote attachment device comprising a pole having an upper end which supports the connector ring, and a gate link operating mechanism that has a flexible cable deployed downwardly along the pole and having a lower end which may be grasped and tensioned to open the gate link and enable the hook link hook an anchor member, and released to allow a spring to close and lock the gate link.

10 Claims, 15 Drawing Sheets

(56) References Cited

U.S. PATENT DOCUMENTS

| | | | | |
|---|---|---|---|---|
| 8,327,788 B1 * | 12/2012 | Cardarelli | ............... | B63B 21/54 114/221 R |
| 8,398,134 B1 * | 3/2013 | Mortensen | .............. | B66F 19/00 248/925 |
| 8,443,747 B1 * | 5/2013 | Cardarelli | ............... | B63B 21/04 114/221 R |
| 8,905,449 B2 * | 12/2014 | Calvert | ................ | F16B 45/025 24/599.1 |

* cited by examiner

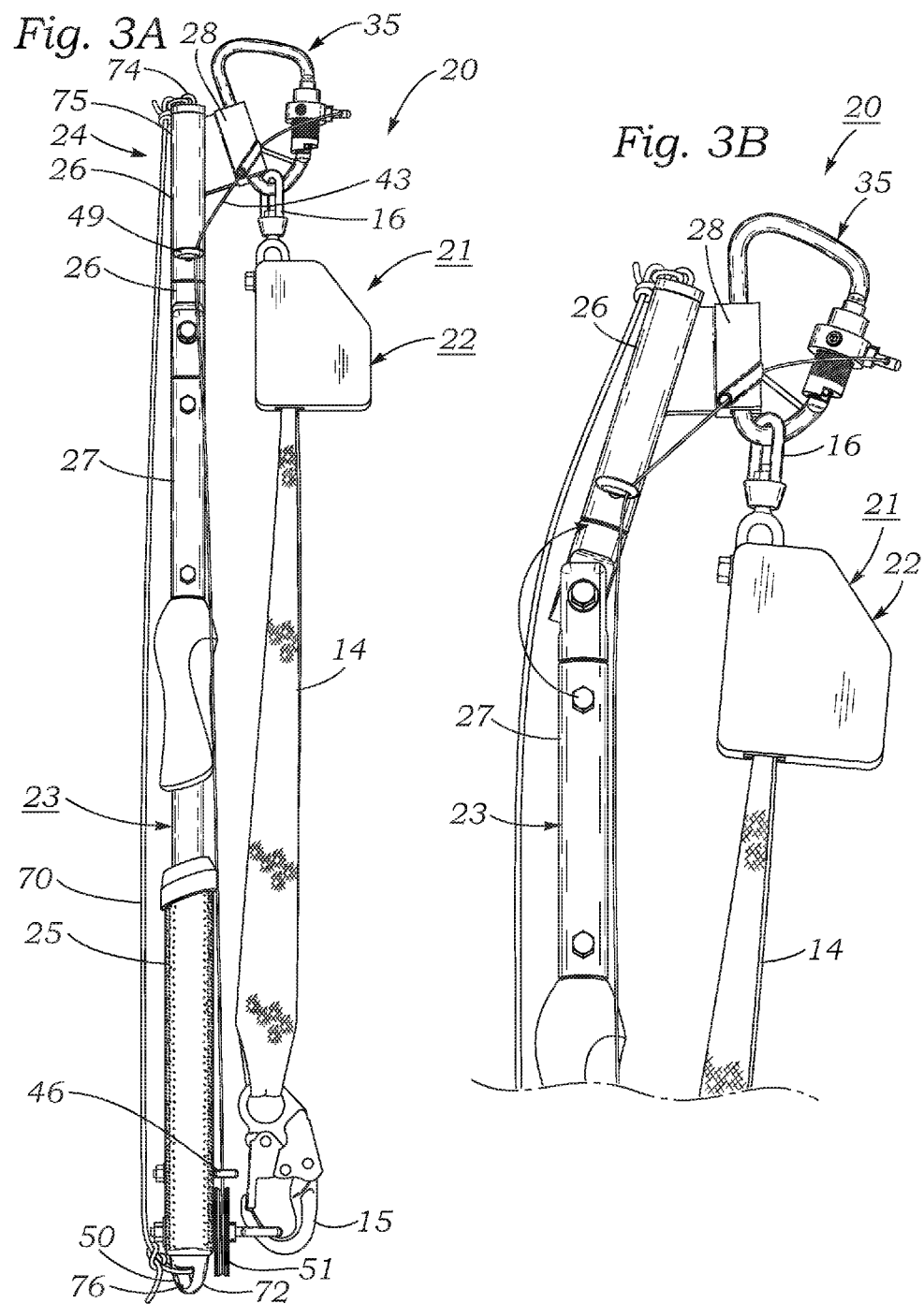

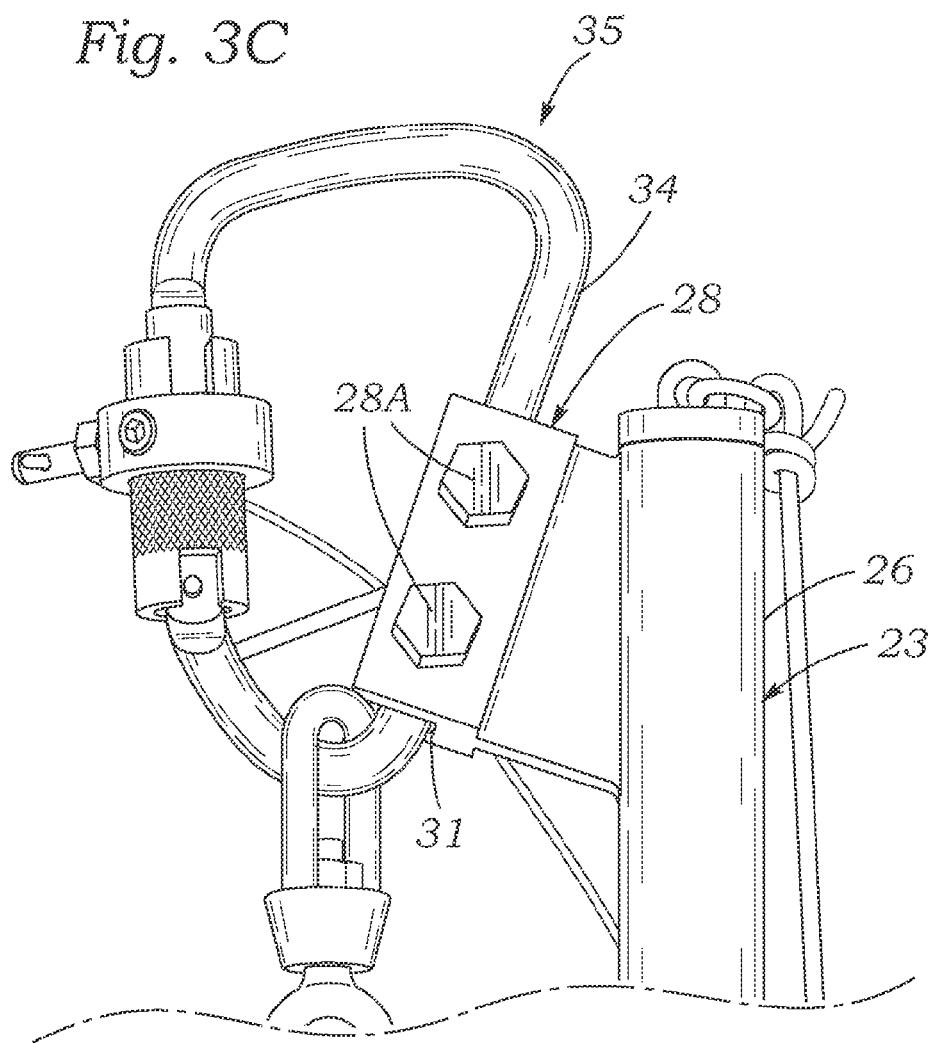

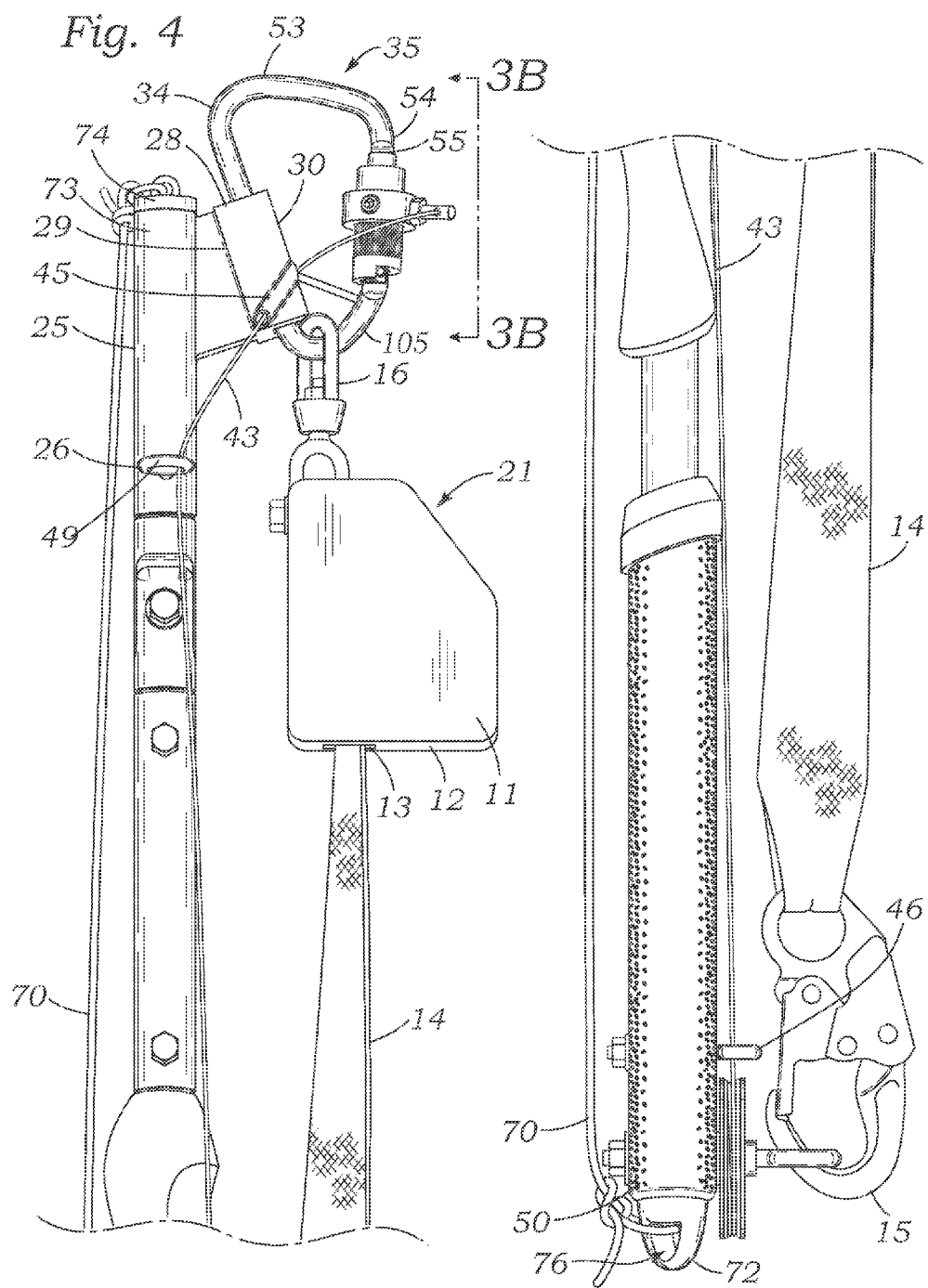

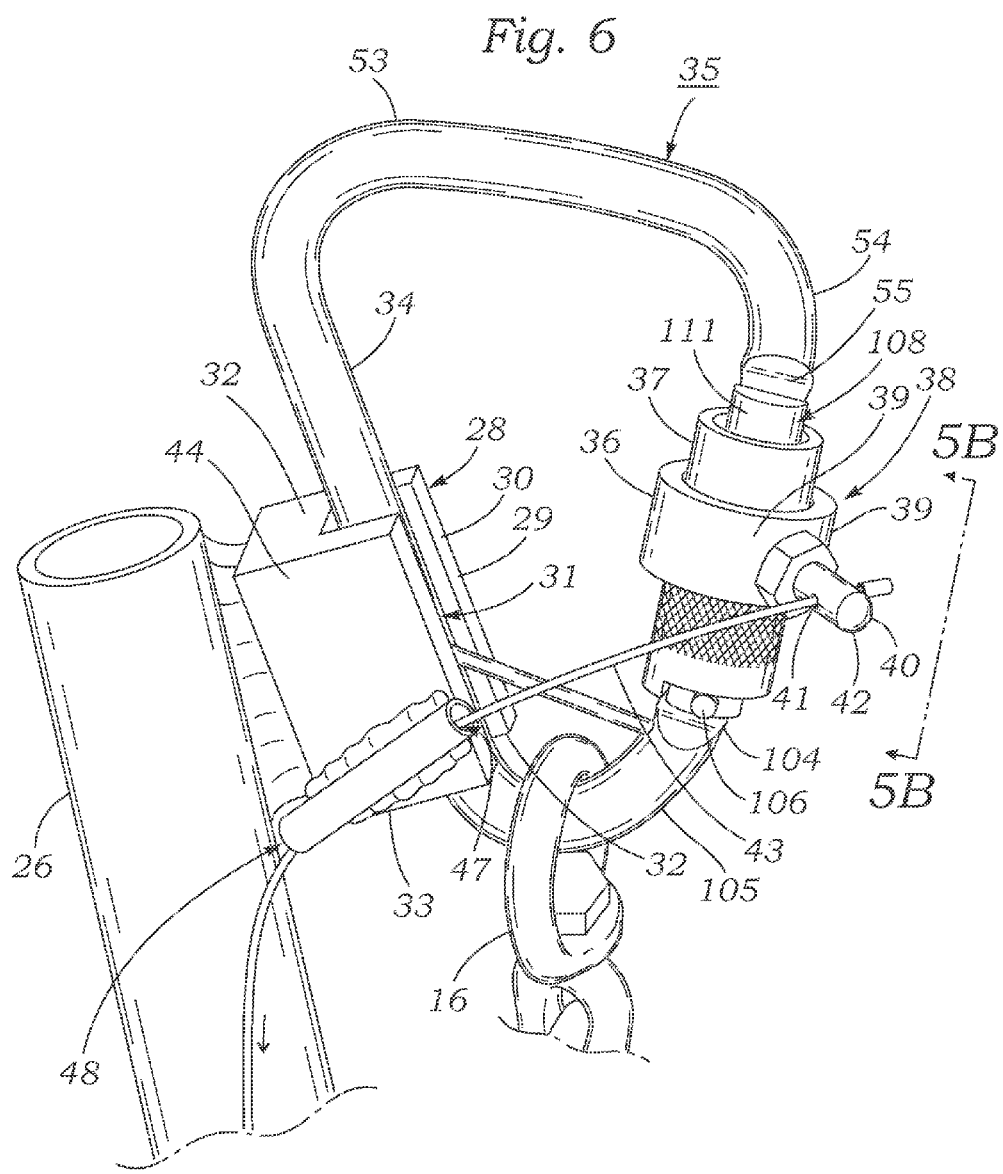

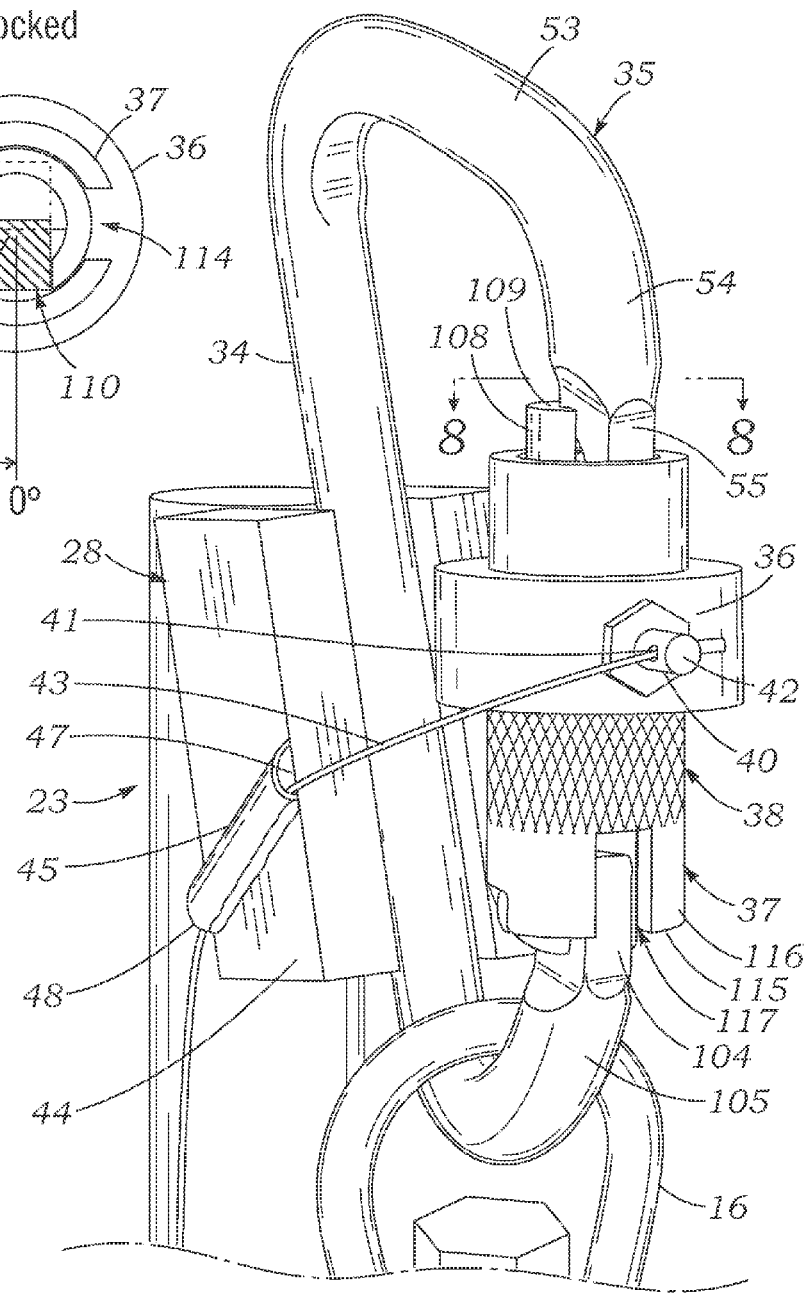

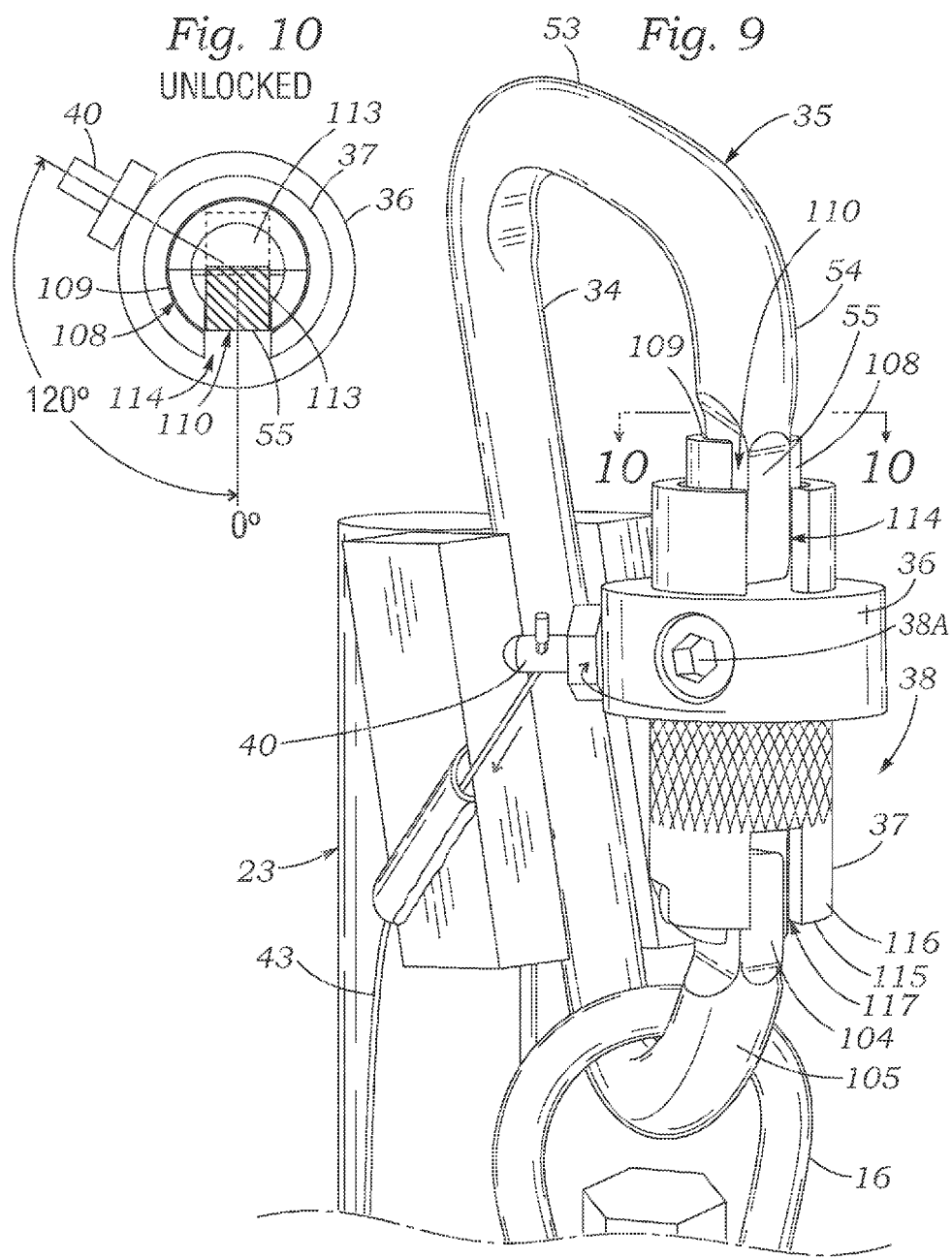

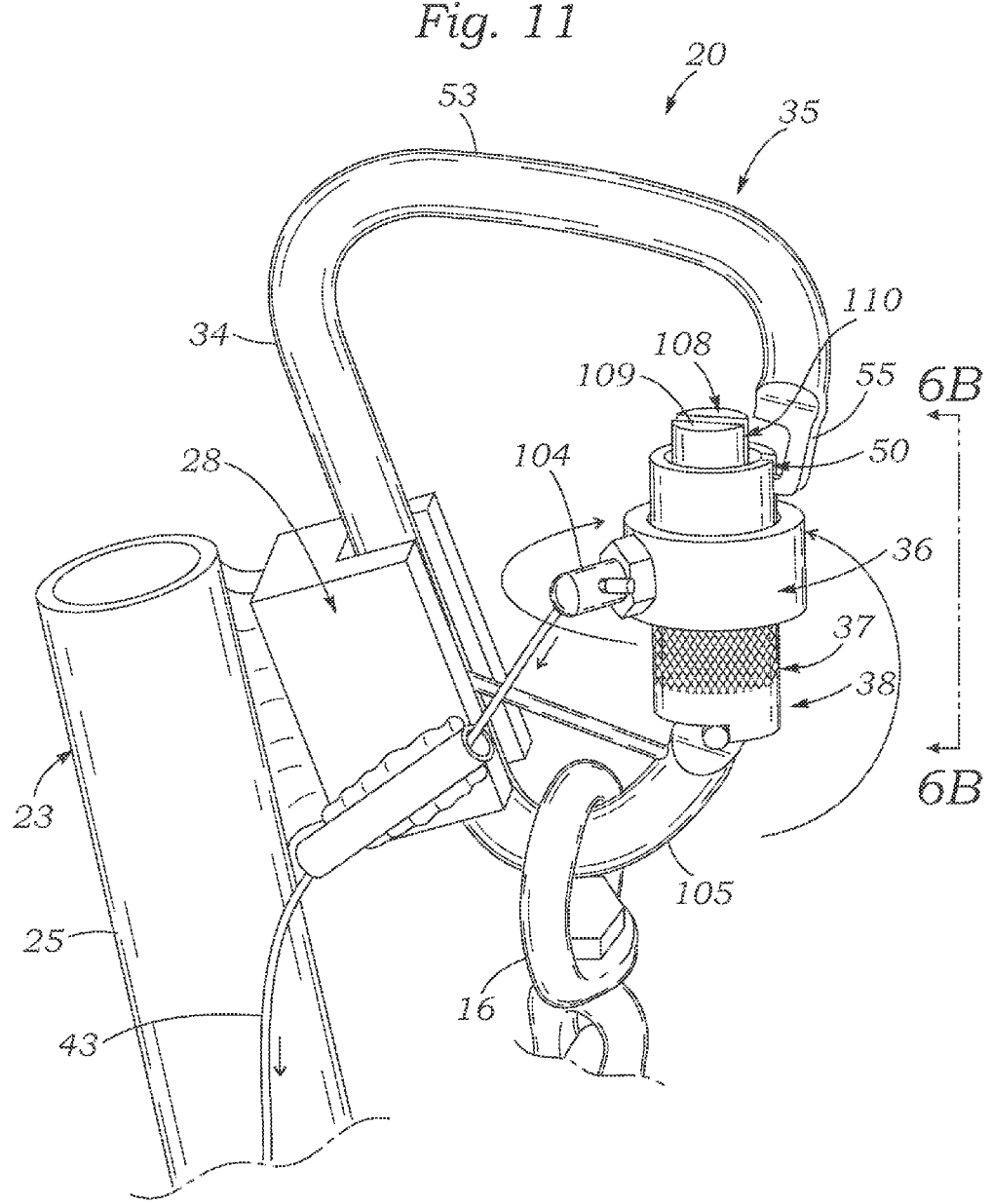

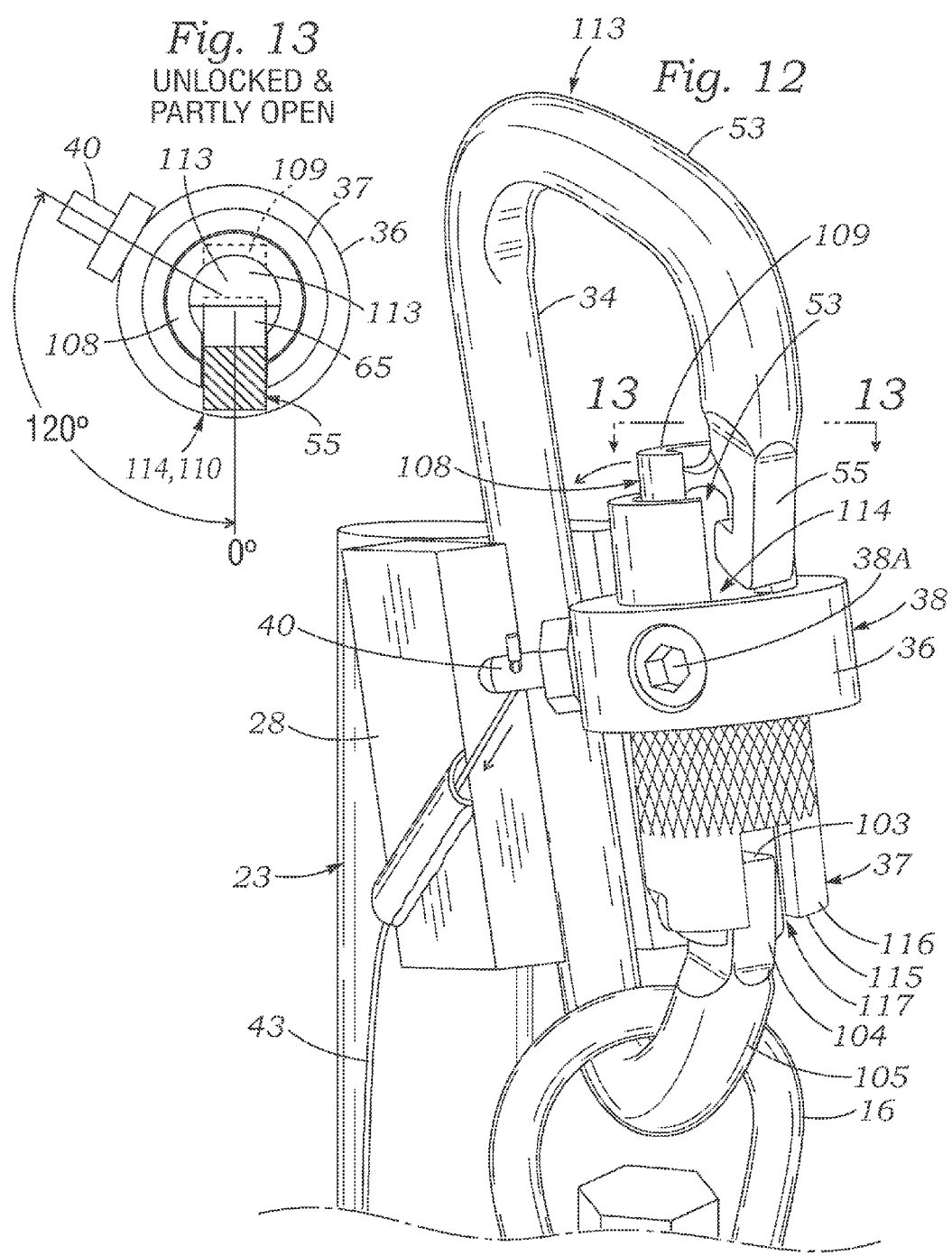

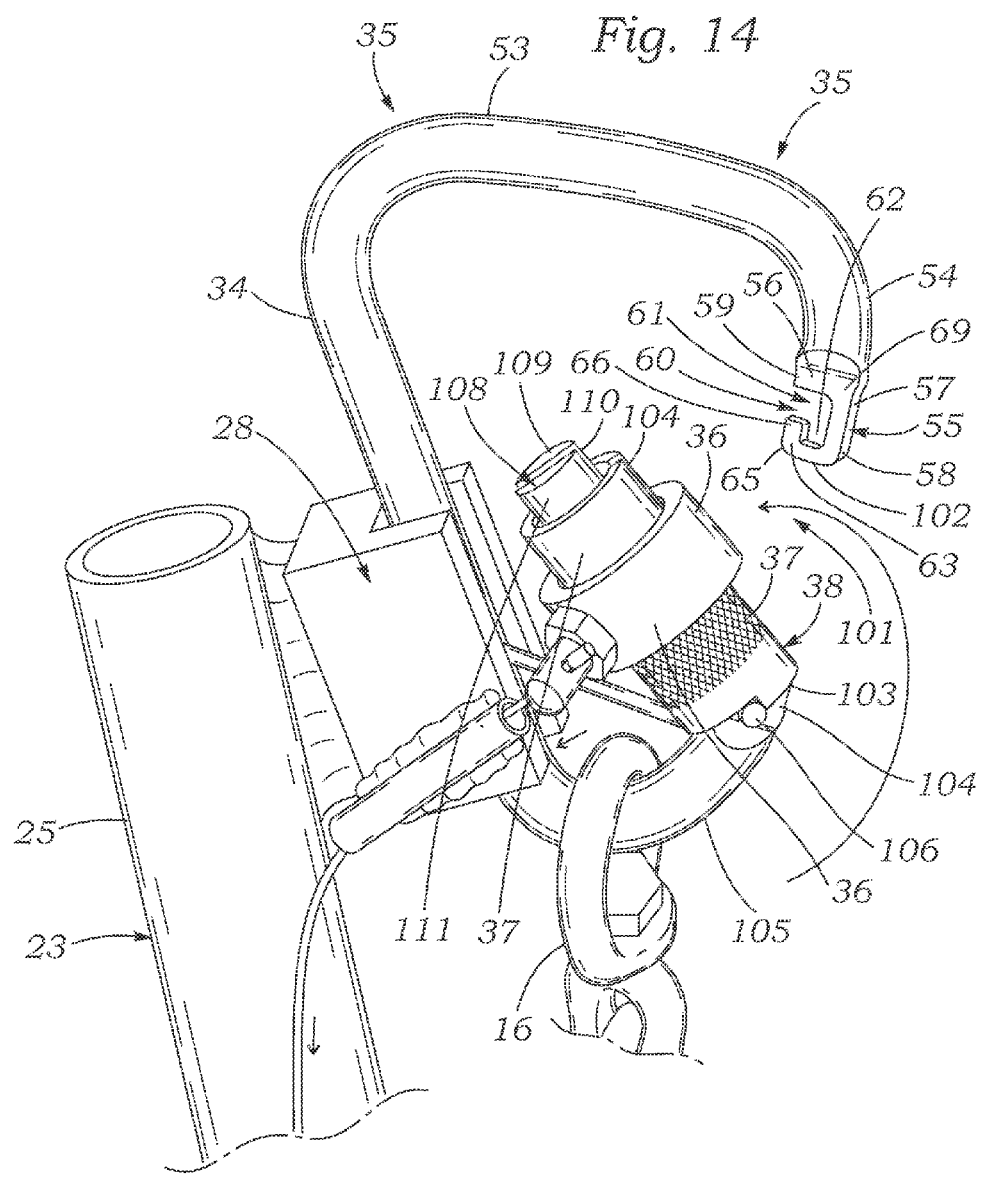

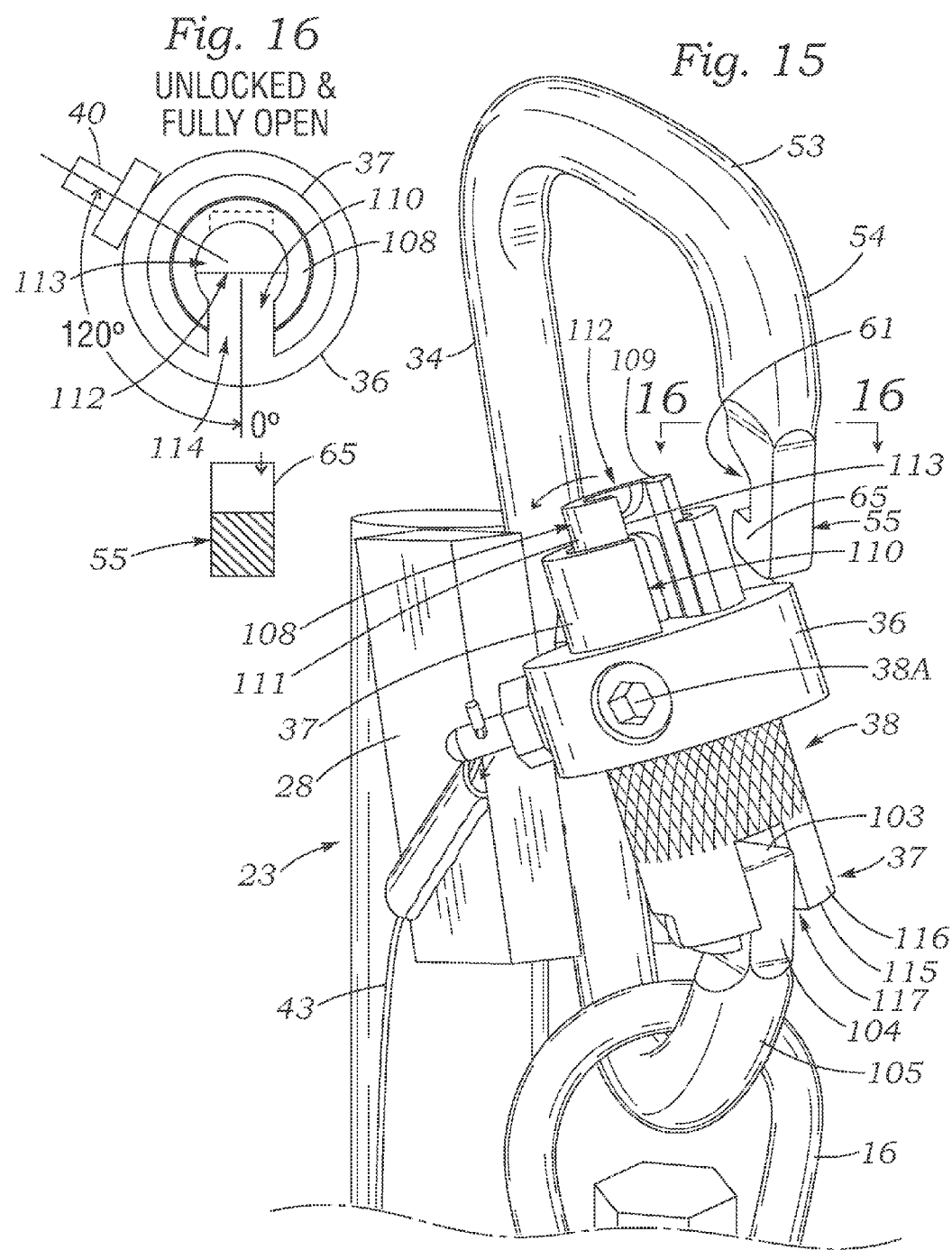

REMOTELY OPERABLE PERSONAL FALL ARRESTMENT DEVICE AND APPARATUS

The present application claims priority of and to U.S. provisional application No. 61/929,056, filed Jan. 18, 2014, and incorporates by reference the entire contents of that application.

BACKGROUND OF THE INVENTION

A. Field of the Invention

The present invention relates to safety apparatus for protecting against injurious or potentially fatal falls of workers such as construction workers or window washers working at elevations of more than a few feet above the ground. More particularly, the invention relates to a personal fall arrestment apparatus which includes a self-retracting lanyard (SRL) and a remotely operable attachment device for the SRL that enables the anchoring connector ring of the SRL to be remotely attachable by a workman to fixed anchor members located at elevations above the reach of a workman.

B. Description of Background Art

Federal and state safety regulations such as those promulgated by OSHA or Cal/OSHA routinely include requirements that persons exposed to fall hazards during the course of their work be protected from injury or death by a personal fall arrest system. Such systems typically include a body harness which is secured around the body of a worker and hooked to a self-retracting lanyard (SRL). The SRL includes a housing that has an upper attachment connector ring which is securable to a fixed anchoring member such as a J-bar or eye-bolt located above a working level and securely fastened to an anchoring structure such as a beam or column of a building.

The SRL of a typical personal fall arrestment system includes a lifeline consisting of a cable or belt which retractably extends from a lower part of the SRL housing, and has at the lower end thereof a swivel connector which is releasably fastenable to a body harness. A typical SRL contains within its housing a shock absorbing deceleration device which allows a pre-determined length of lifeline to pay out from the housing in response to tension exerted on the lifeline caused by movement of a worker away from an anchoring member. Typically, the deceleration device includes a spool or reel which allows a pre-determined length of about two to six feet of lifeline to pay out from the SRL housing with little resistance, thus enabling the worker to move horizontally on scaffolding, or to free-fall that distance.

An SRL deceleration device also includes a mechanism such as a spiral clock spring, which exerts an increasing torque on the spool or reel to thus gradually decrease the rate at which a safety line or web may be paid out from the SRL housing, thus decelerating the falling worker to a complete stop over a distance of, for example, about 3.5 feet. The total maximum length of safety line which may be withdrawn from a typical SRL deceleration device, e.g., from about 5.5 feet to about 9.5 feet, is chosen to have a value sufficient to position the feet of a workman above the ground or any obstruction such as a protruding part of a building or scaffolding below him, thus preventing the workman from impact injury.

Personal fall arrestment systems of the type described above are widely used and effective. However, there is a problem associated with the use of such systems in many practically encountered situations, as will now be described.

The self-retracting lanyard (SRL) or other such deceleration device of a fall arrest system must be quickly and easily but securely attachable to and removable from a fixed anchoring member at a work site, at a location above a worker. A releasable SRL anchoring support connector ring used for this purpose must not only be easily attachable to and removable from an anchoring member, but must also be capable of withstanding large tensional dynamic loads, such as those imposed by a 200-lb man falling and pulling on the lifeline connected to the deceleration device. Because of the large potential dynamic loads which a self-retracting lanyard (SRL) connector ring must withstand, such connector rings are typically constructed to be capable of withstanding static loads of up to 3000 lbs.

Since anchoring connector rings of self-retracting lanyards and other such deceleration devices must be readily attachable to an anchoring member such as an eye-bolt which has a closed ring shape, SRL anchoring connectors are typically of the carabiner type. Carabiner connectors have the form of an oval or D-shaped ring which has a locking link or gate pivotable from a locked position to an open position in which the D-shaped ring is closed. In the open and unlocked position, an upper end of the gate link which was locked to the lower end of a downwardly curved, hook-like upper front segment of the D-shaped ring may be pivoted away from the upper front segment of the D-shaped ring. This position enables the now unobstructed lower end of the upper front segment to be inserted into a closed ring of an anchoring member, such as the eye of an eye-bolt, or hooked around a rebar. The locking gate link must also be pivotable back to a locked position after the carabiner connector ring has been connected to an anchoring member.

Most safety standards require that two distinct actions be performed to unlock and open the locking gate link of an anchoring connector ring such as the carabiner type connector ring described above. For example, a carabiner connector widely used in existing fall arrestment systems requires the following two distinct actions to open the locking gate link. First, a cylindrical sleeve of the locking gate link must be twisted about its longitudinal axis to disengage a locking lug at the upper end of the locking gate link from a slot in the lower end of the downwardly curved upper end segment of the connector ring. Second, the twisted locking gate sleeve is pulled away from the downwardly curved upper end of the carabiner connector ring. The twisted and tensioned locking gate link is then pivoted towards the interior of the carabiner connector ring to create an opening between the lower end of the downwardly curved upper front segment of the connector ring, which may then be inserted into the eye of an eye-bolt, hooked around a rebar, or attached to another such anchoring member. The carabiner connector ring is then securely locked to the anchoring member by reversing the foregoing steps. These steps consist of releasing tension and torque on the twisted locking gate sleeve. Spring tension provided by spring components of the locking gate then cause the twisted locking gate sleeve to lockingly re-engage the downwardly protruding upper end of the carabiner connector ring.

Since SRL anchoring connectors including carabiner type connector rings of the type described above must be secured to an anchoring member which is usually several feet or more above the head of a worker, it can be readily appreciated that securing an SRL anchoring connector ring to an elevated anchoring member at a work site may be problematic. The present invention was developed to solve such problems by providing a personal fall arrestment apparatus that includes an attachment device which enables the connector ring at the upper end of an SRL to be remotely attachable to and removable by a workman to an anchoring member located above and beyond the convenient reach of the workman.

OBJECTS OF THE INVENTION

An object of the present invention is to provide a remote attachment device for facilitating attachment of an anchoring connector ring of a self-retracting lanyard (SRL) component of a fall arrestment apparatus to a fixed anchor member such as a rebar or bolt eye fixed to a structure such as a building, which anchor member may be at a location above and thus not readily accessible to a workman.

Another object of the invention is to provide a remote attachment device for fall arrestment apparatus which includes a pole that preferably has a telescopically adjustable length, the pole having at an upper end thereof an anchoring connector ring support saddle block for attachment to an upper anchoring connector ring such as a carabiner connector ring of a fall arrestment apparatus, and an anchoring connector locking gate operating mechanism which has a flexible cable tensionable to remotely unlock and pivot to an open position the locking gate of the anchoring connector ring and thus enable a downwardly protruding end segment of the connector ring to be inserted into and engage a fixed anchoring member such as the eye of an eye-bolt, released in tension to enable spring tension in the anchoring connector gate to pivot the locking gate to a closed position, and rotated to engage the lock, the flexible tension cable being deployed downwardly from the gate operating mechanism through guide eyes attached to the telescopic pole to a lower handle end of the pole and having at the lower end thereof an end which may be pulled downwardly to unlock the locking gate and released to allow spring tension of the locking gate to restore the locking gate to a locking position.

Another object of the invention is to provide a remotely attachable personal fall arrestment apparatus which includes a self-retracting lanyard (SRL) that has a housing which has protruding upward from an upper end thereof an anchoring connector ring such as a carabiner connector ring for releasable attachment to an anchor member such as a rebar or bolt eye, a shock reducing deceleration device within the SRL housing, which is suspended from the anchoring connector ring, a lifeline retractably extendable from a lower side of the SRL housing and terminated at a lower end thereof by a swivel snap hook releasably attachable to a safely body-harness worn by a worker, and an SRL remote attachment device including a telescopically adjustable pole which has at an upper end thereof an anchoring connector ring support saddle block, and an anchoring connector ring locking gate operating mechanism for remotely unlocking, opening, and locking the locking gate of an anchoring connector ring, the gate operating mechanism including a flexible tension cable deployed downwardly from the gate operating mechanism along the telescopic pole to a lower handle end of the pole and having at a lower end thereof which may be pulled downwardly to unlock the anchoring connector ring locking gate, and released to allow spring tension of the locking gate to restore it to a locking position.

Various other objects and advantages of the present invention, and its most novel features, will become apparent to those skilled in the art by perusing the accompanying specification, drawings and claims.

It is to be understood that although the invention disclosed herein is fully capable of achieving the objects and providing the advantages described, the characteristics of the invention described herein are merely illustrative of the preferred embodiments. Accordingly, I do not intend that the scope of my exclusive rights and privileges in the invention be limited to details of the embodiments described. I do intend that equivalents, adaptations and modifications of the invention reasonably inferable from the description contained herein be included within the scope of the invention as defined by the appended claims.

SUMMARY OF THE INVENTION

Briefly stated, the present invention comprehends a novel fall arrestment apparatus that includes a self-retracting lanyard apparatus (SRL) and a remotely operable attachment device which enables the SRL to be remotely attached to and removed from an anchor member such as an eye bolt or rebar fixed to a building or other such structure at a location above the reach of a workman. The remotely operable attachment device for a fall arrestment apparatus according to the present invention includes an elongated, preferably telescopically adjustable pole which has at the upper end thereof a saddle block clamp. The saddle block clamp is used to clamp to and hold a rear leg of a carabiner connector ring which protrudes from the housing of a self-retracting lanyard (SRL) of the type which are routinely used to support a safety harness worn by a workman to limit the distance which the workman may accidentally free fall, thus guarding against injury or death to a workman working at elevations more than a few feet above the ground.

According to the invention, the remotely operable fall arrestment apparatus attachment device includes a remotely operable carabiner lock actuator mechanism located at the upper end of the pole. The actuator mechanism includes a collar which fits concentrically over and is fastened to the rotatable sleeve of a pivotable locking gate member of a carabiner connector ring.

The carabiner lock actuator mechanism according to the present invention includes a flexible cable which is fastened at the upper end thereof to a screw which protrudes radially from the collar. The cable is disposed downwardly along the support pole through guide eyes of the remotely operable SRL attachment device, and is terminated at the lower end thereof by an operating handle, or preferably wound around a rotatable pulley. Pulling on a lower end of the cable tensions the cable and causes the collar and carabiner locking gate sleeve to rotate 90 degrees about the longitudinal axis of the sleeve. This aligns a slot at the upper end of the locking sleeve with a lug at the lower end of the downwardly protruding curved upper front segment of a D-shaped carabiner ring. Further tensioning of the cable causes the now free upper end of the locking gate sleeve to pivot inwardly towards the interior of the carabiner ring, the lug passing through the slot in the sleeve. This motion frees the lower end of the downwardly protruding upper front segment of the carabiner ring to be inserted into an anchoring member such as the eye of an eye-bolt fixed to a structure such as a building. Releasing tension on the lower end of the cable enables a pivot spring within the carabiner locking mechanism to pivot the locking sleeve and locking gate back into co-linear alignment with the downwardly protruding front upper segment of the carabiner ring. Further decreasing tension in the operating cable enables a torque spring in the carabiner locking mechanism to rotate the locking sleeve into locking engagement with the downwardly protruding upper end of the upper front segment of the carabiner ring, in which the un-slotted upper end of the sleeve is rotated into an orientation which blocks pivotable motion of the sleeve.

BRIEF DESCRIPTION OF THE DRAWINGS

FIG. 3A is a right side elevation view of a remotely operable attachment device for a self-retracting lanyard (SRL) apparatus according to the present invention.

FIG. 3B is a fragmentary view on an enlarged scale of the device of FIG. 3A, showing an upper part thereof in a tilted configuration.

FIG. 3C is a left side elevation view of the device of FIG. 3B on a further enlarged scale.

FIG. 4 is a broken side view elevation view of the apparatus of FIG. 3A, on an enlarged scale.

FIG. 6 is a fragmentary view of an upper part of the apparatus of FIGS. 3A-5, on an enlarged scale.

FIG. 7 is an oblique view of the apparatus of FIG. 6, on a further enlarged scale.

FIG. 8 is a transverse sectional view of the apparatus of FIG. 7, taken in the direction of line 8-8.

FIG. 9 is an oblique view of the apparatus of FIG. 6 on a further enlarged scale, showing a first step in opening a locking gate of the apparatus.

FIG. 10 is a transverse sectional view of the apparatus of FIG. 9, taken in the direction of the line 10-10.

FIG. 11 is a side elevation view of the apparatus of FIG. 6, showing a second step in opening the locking gate of the apparatus.

FIG. 12 is an oblique view of the apparatus of FIG. 11.

FIG. 13 is a transverse sectional view of the apparatus of FIG. 12, taken in the direction of the line 13-13.

FIG. 14 is a side elevation view of the apparatus of FIG. 6, showing a third step in opening the locking gate of the apparatus of FIG. 4.

FIG. 15 is an oblique view of the apparatus of FIG. 7A.

FIG. 16 is a transverse sectional view of the apparatus of FIG. 7B, taken in the direction of the line 16-16.

DESCRIPTION OF THE PREFERRED EMBODIMENT

Figure 1:
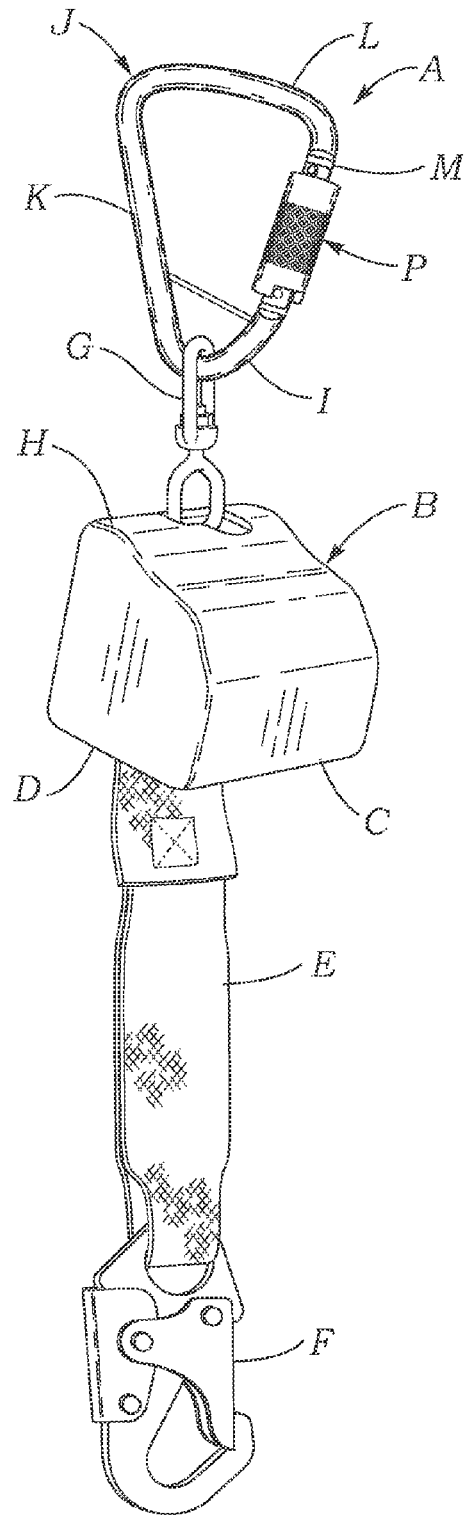
FIG. 1 is a perspective view of a prior art self-retracting lanyard (SRL) apparatus for fall arrestment which includes a lifeline in the form of a web belt.
Figure 2:
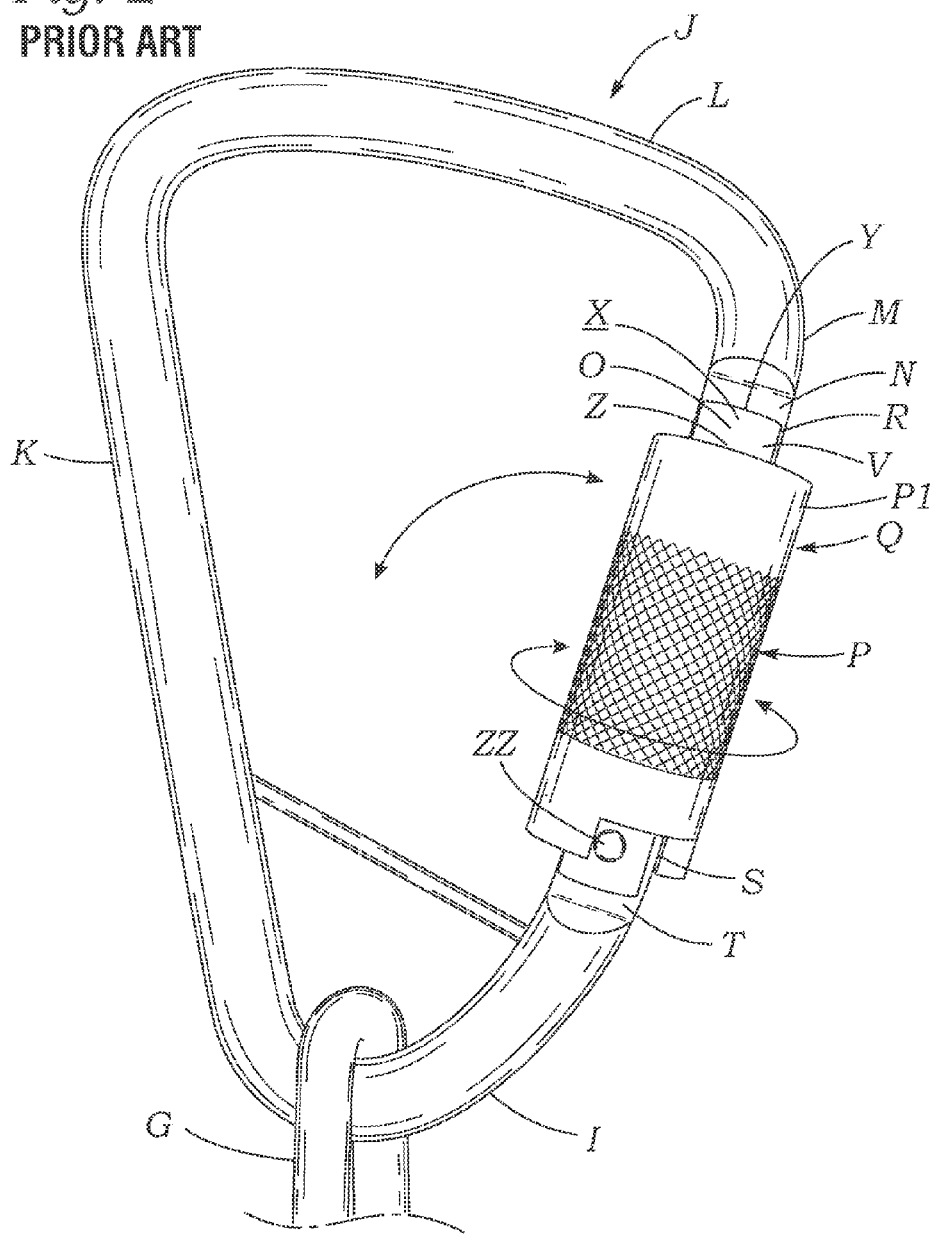
FIG. 2 is a fragmentary side elevation view of the prior art SRL of FIG. 1, showing on an enlarged scale a carabiner-type anchoring connector component of the apparatus.

FIGS. 1 and 2 illustrate a prior art self-retracting lanyard (SRL) of the type which may be used in a remotely attachable personal fall arrestment apparatus according to the present invention. As shown in FIGS. 1 and 2, prior art SRL A includes a hollow block-shaped housing B that has protruding downwards through a slot D in a lower horizontal wall C of the housing a web-shaped lifeline E. An upper end of lifeline E is wound around a spool or reel of a deceleration device (not shown) located within housing B. Lifeline E has fastened to the lower end thereof a swivel snap ring F which is releasably attachable to a safety harness worn by a workman. The deceleration device within housing B allows a length of lifeline E to be paid out slowly, enabling lateral movement of a workman, but limits rapid vertical movement of a workman, such as in an accidental free fall, to a safe maximum distance.

As shown in FIGS. 1 and 2, SRL A includes a double-link swivel suspension connector G which protrudes upwardly from an upper wall H of housing B. The upper link of connector G receives the upwardly curved lower front leg I of a D-ring shaped carabiner-type anchoring connector ring J. Carabiner-type anchoring connector ring J includes a relatively long straight rear leg K, and a medium length upper leg L which angles downward slightly and forward from the rear leg. Upper leg L has at the front end thereof a short, downwardly angled upper front leg M. As shown in FIG. 2, upper front leg M has at a lower end thereof a flattened section N which has protruding laterally inwardly therefrom a transversely disposed locking slot O formed between two rectangularly shaped transversely disposed upper and lower locking lugs. (See slot 61 and lugs 64, 65 in FIG. 14)

As shown in FIG. 2, carabiner anchoring connector ring J includes a locking gate member P which is disposed between an opening Q formed between the lower end R of upper front leg M and an axially aligned upper end S of an upper flattened part T of lower front leg I. Locking gate member link P is pivotably mounted at a lower end thereof by a pivot pin ZZ to upper flattened end T of lower front leg I of the carabiner connector ring J.

Locking gate member P of carabiner connector ring J has an outer circular cross-section tubular sleeve P1 which has a knurled outer surface. Sleeve P1 is coaxially and rotatably disposed over a cylindrical locking gate link pin V. Locking gate link pin V has extending downwards from the upper transverse end face W thereof an elongated, longitudinally disposed slot X which penetrates the outer cylindrical wall surface of gate link segment V. Slot X extends radially inwards from the outer cylindrical wall of gate link segment V to a central axially disposed bore V1 that extends into the gate link pin from its upper circular end face W. Slot X has a transversely disposed inner locking ledge section Z for engaging slot O in upper leg M. Locking ledge section Z is contained within bore V1, and is recessed below the upper circular end face W, and radially inwardly at the outer cylindrical wall surface of gate link segment V.

As shown in FIGS. 15 and 16, sleeve P1 has cut through an outer cylindrical wall thereof a longitudinally disposed slot Y which is aligned with slot X in locking gate link pin V when sleeve P1 is rotated 90 degrees from the locked position shown in FIGS. 2 and 6, to the unlocked position shown in FIGS. 15 and 16, the aligned slots X and Y providing clearance for upper front ring segment M.

Locking gate member P includes a pivot spring (not shown) which urges the locking gate member to pivot clockwise about pivot pin ZZ outwards into axial alignment with upper front ring segment M. This enables the locking gate link pin V to receive the flattened section N of upper leg M through slot Y of sleeve P1 and into longitudinal slot X of pin V. The locking gate V may then be twisted counter-clockwise about its longitudinal axis to thus position the locking ledge section Z of the locking gate link pin in locking slot O of upper leg M, and retained in that locked position by spring tension provided by a torque spring (not shown).

Opening locking gate member P requires that sleeve P1 of the gate member first be grasped and twisted 90 degrees clockwise about its longitudinal axis to thus enable flattened section N of upper segment M to become aligned with slots X and Y and thus enable flattened section N of upper segment M to pass through slots X and Y. This enables the gate member P to be pivoted counterclockwise about pivot pin ZZ towards the interior of carabiner connector ring J to thus disengage locking section Z of the locking gate link pin V from slot O of upper leg M. As may be understood by referring to FIG. 7, sleeve P1 has cut through a lower annular end wall P3 thereof and the outer cylindrical wall of the sleeve a slot X2. When sleeve P1 is rotated 90 degrees from the locked position shown in FIGS. 2 and 6 to the unlocked position shown in FIGS. 15 and 16, slot X2 is aligned with and thus provides clearance for flattened upper end T of lower front leg I, and thus enables the sleeve to be pivoted counterclockwise relative to lower front leg I.

When locking section Z has been disengaged from slot O, and the locking gate member P is pivoted counterclockwise on lower pivot pin ZZ towards the interior of the ring-shaped carabiner connector ring J, the lower end of downwardly curved front upper end leg M of the carabiner connector ring becomes unobstructed, as shown in FIG. 15. This enables the lower end of the front upper leg M of the carabiner connector ring to be inserted into an eye of an anchoring bolt, or hooked around a J-hook, rebar, or other suitable anchoring member which is securely fixed to a building or other such fixed structure.

After engaging an anchoring member such as a bolt eye, hook, or rebar with upper end leg M of carabiner connector ring J, the carabiner connector ring J is closed and locked by pivoting the locking gate member P clockwise into axial alignment with the front upper and lower connector legs M and I, respectively. The pivotal motion is followed by a counterclockwise twisting motion of the locking gate member sleeve P1 about its longitudinal axis to thus mutually engage the locking gate ledge section Z of the locking gate link pin V within locking slot O of front upper leg M. The pivoting and twisting motions are facilitated by pivot and torque springs, respectively (not shown), as discussed above.

FIGS. 3A-16 illustrate a remotely anchorable personal fall arrestment apparatus 20 according to the present invention, which includes a remotely operable SRL attachment device 21, and an SRL apparatus 22 that has a construction which includes a modification of a prior art SRL device A of the type shown in FIGS. 1 and 2 and described above.

Figure 5:
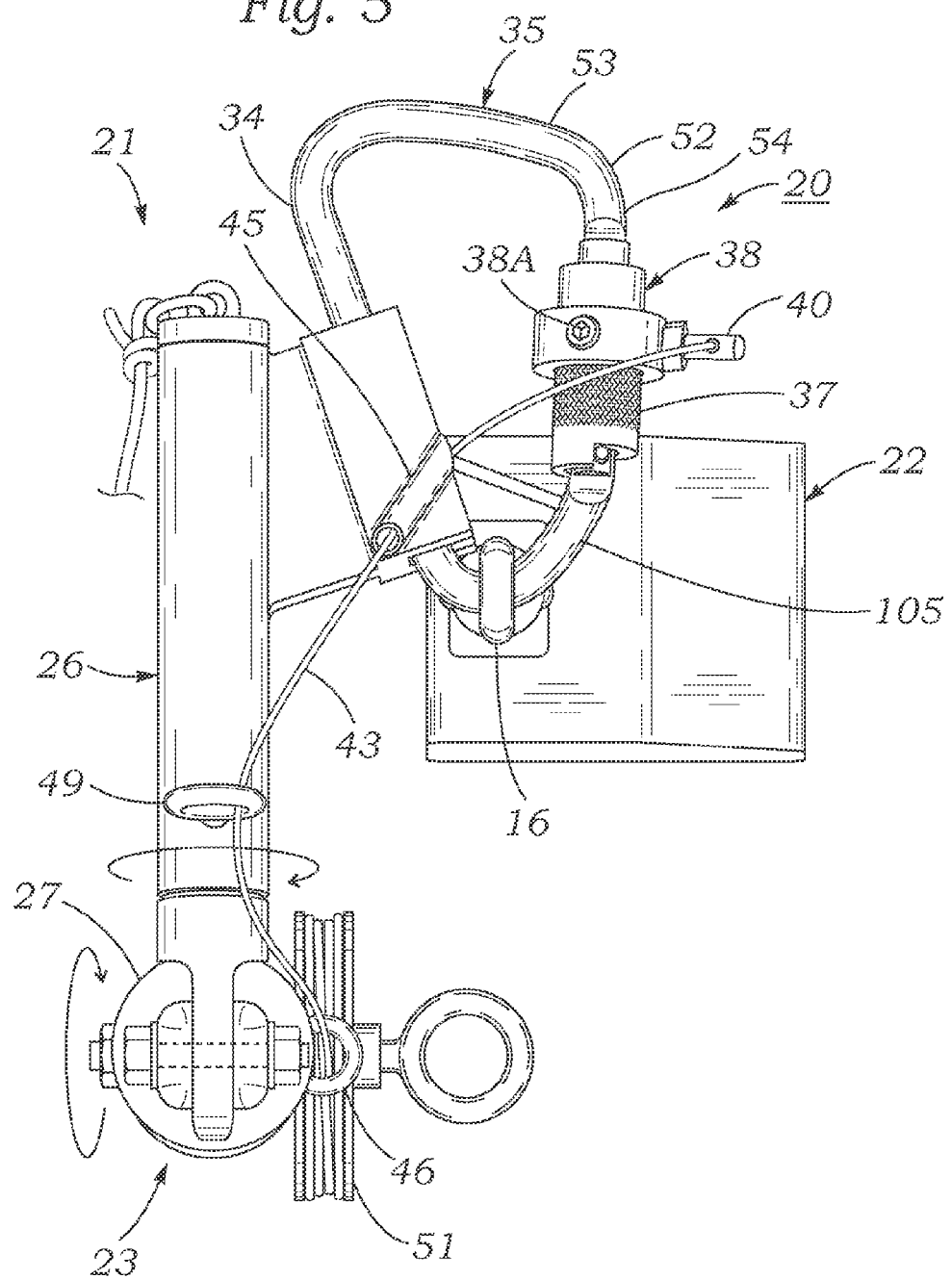
FIG. 5 is a front elevation view of the apparatus of FIG. 3, showing an upper end of a support pole thereof tilted rearwardly.

As shown in FIGS. 3A-5, fall arrestment apparatus 20 includes an SRL device 22 and a remotely operable SRL attachment device 21 that includes a telescopically extendible support pole 23 which has an upper end 24 that supports the SRL 22, and a lower end 25 for grasping in the hand of a workman. Preferably, the upper end 24 of support pole 23 of attachment device 21 includes a short, straight tubular end section 26 which is pivotably adjustable between a position axially aligned with a central section 27 of support pole 23, as shown in FIG. 3A, and positions angled forward with respect to the central pole section as shown in FIGS. 3B and 5.

As shown in FIGS. 3A-5, SRL device 22 is of conventional design, and includes a hollow block-shaped housing 11 that has protruding downwards through a slot 13 in a lower around a spool or reel of a deceleration device (not shown) located within housing 11. Lifeline 14 has fastened to the lower end thereof a swivel snap ring 15 which is releasably attachable to a safety harness worn by a workman. The deceleration device within housing 11 allows a length of lifeline 14 to be paid out slowly, enabling lateral movement of a workman, but limits rapid vertical movement of a workman, such as in an accidental free fall, to a safe maximum distance.

As shown in FIGS. 3A-5, SRL 22 includes a double-link swivel suspension connector 16 which protrudes upwardly from an upper wall 17 of housing 11. The upper link of connector 16 receives the curved lower end 105 of a D-ring shaped carabiner-type anchoring connector ring 35. Carabiner-type anchoring connector ring 35 includes a relatively long straight rear leg 34, and a medium length upper leg 53 which angles downward slightly and forward from the rear leg. Upper leg 53 has at the front end thereof a short, downwardly angled upper front leg 54. As shown in FIG. 14, upper front leg 54 has at a lower end thereof a flattened section 55 which has protruding laterally inwardly therefrom a transversely disposed locking slot 61 formed between two rectangularly shaped transversely disposed upper and lower locking lugs, 64, 65.

As may be seen best by referring to FIGS. 3A-6, remotely operable fall arrestment SRL attachment device 21 of apparatus 20 includes a carabiner connector ring support clamp 28 which is fastened to the outer surface of upper pivotal end section 26 of support pole 23. As shown in FIG. 6, carabiner connector ring support clamp 28 has the form of a rectangular shaped saddle block 29 which has in an outer longitudinally disposed flat face 30 thereof an elongated rectangular cross-section groove 31 that penetrates upper and lower transverse end faces 32, 33 of the saddle block. Groove 31 of carabiner support clamp 28 receives therein the long straight rear leg 34 of a carabiner connector ring 35 of an SRL device 22, which is secured to the carabiner connector ring by set screws 28A, as shown in FIG. 3C.

As may be seen best by referring to FIGS. 6, 7, 9, 12, and 15, carabiner locking ring 35 is substantially similar in construction and function to a prior art carabiner locking ring J of the type shown in FIGS. 1 and 2 and described above. However carabiner locking ring 35 according to the present invention is modified by the addition of a bushing 36, as will be described below.

As shown in FIGS. 6, 7, 9, 12, and 15, carabiner locking ring 35 includes a relatively long straight rear leg 34 and an intermediate length upper leg 53 which angles downwardly slightly and forward from the rear leg. Upper leg 53 has protruding downwards from the front end thereof a short, downwardly angled upper front leg 54. Carabiner locking ring 35 also has a lower front leg 105 which protrudes upwardly from a lower end of rear leg 34.

As shown in FIG. 14, upper front leg 54 of carabiner locking ring 35 has at a lower end thereof a flattened lower end section 55. Flattened lower end section 55 of upper front leg 54 has flat and parallel vertically disposed left and right faces 56 and 57, and flat and parallel vertically disposed front and rear edge faces 58, 59, forming a thin, rectangular bar shaped structure. Rear edge face 59 has protruding laterally inwardly therefrom a J-shaped notch 60 which has a horizontal rectangular section 61 that has protruding downwards from an inner end thereof a vertical rectangular section 62. Thus shaped, notch 60 forms a rearward-facing, J-shaped locking leg 63 which has an upper horizontal straight bar shaped locking lug 64 and a lower opposed J-shaped locking lug 65 which has a vertically upwardly protruding outer end section 66.

As may be seen best by referring to FIGS. 6, 15, and 16, carabiner connector ring 35 is substantially similar in construction and function to the prior art carabiner connector ring J shown in FIGS. 1 and 2 and described above, modified by the addition of actuator bushing 36. Thus, as shown in FIGS. 6 and 14, carabiner anchoring connector ring 35 includes a locking gate member 38 which is disposed between an opening 101 formed between the lower end 102 of upper front leg 54 and an axially aligned upper end 103 of upwardly angled upper flattened part 104 of lower front leg 105. Locking gate member 38 is pivotably mounted at a lower end thereof by a pivot pin 106 to upper flattened end 104 of lower front leg 105 of carabiner connector ring 35.

The locking gate member 38 of carabiner connector ring 35 has an outer circular cross-section sleeve 37 which has a knurled outer surface. Sleeve 37 is coaxially and rotatably disposed over a cylindrical locking gate link pin 108. Locking gate link pin 108 has extending downwards from the upper transverse end face 109 thereof an elongated, longitudinally disposed slot 110 which penetrates the outer cylindrical wall surface 111 of gate link pin 108. Slot 110 extends radially inwardly from outer cylindrical wall surface 111 of gate link pin 108 to a central, axially disposed bore 112 that extends into the gate link segment from its upper circular end face. Slot 110 has a transversely disposed inner locking ledge section 113 for engaging slot 61 in upper leg 54.

As shown in FIGS. 8, 15, and 16, sleeve 37 of carabiner connector ring 35 has cut through an outer cylindrical wall surface thereof a longitudinally disposed slot 114 which is aligned with slot 110 in gate link pin 108 when sleeve 37 is rotated 90 degrees from the locked position shown in FIG. 6, to the unlocked position shown in FIGS. 15 and 16, the aligned slots 110 and 114 providing clearance for upper front ring segment 54.

Locking gate member 38 of carabiner connector ring 35 includes a pivot spring (not shown) which urges the locking gate member to pivot clockwise about pivot pin 106 outwards into axial alignment with upper front leg 54 of the connector ring. This enables the locking gate pin 108 to receive the flattened lower end section 55 of upper front leg 54 through slot 114 of sleeve P1 and into longitudinal slot 110 of pin 108. The locking gate member 38 may then be twisted counterclockwise about its longitudinal axis to thus position the locking ledge section 113 of the locking gate link pin 108 in locking slot 61 of upper front leg 54, and retained in that locked position by spring tension provided by a torque spring (not shown).

Opening locking gate member 38 of carabiner connector ring 35 requires that sleeve 37 of the gate member first be grasped and twisted 90 degrees clockwise about its longitudinal axis to thus enable flattened lower end section 55 of upper front leg 54 to become aligned with slots 110 and 114 and thus enable flattened lower end section 55 of upper front leg 54 to pass through slots 110 and 114. This enables the gate member 38 to be pivoted counterclockwise about pivot pin 106 towards the interior of carabiner connector ring 35 to thus disengage locking ledge section 113 of the locking gate link pin 108 from slot 61 of upper leg 54. As may be understood by referring to FIG. 7, sleeve 37 has cut through a lower annular end wall 115 thereof and the outer cylindrical wall 116 of the sleeve a slot 117. As shown in FIGS. 15 and 16, slot 117 provides clearance for flattened upper end 104 of lower front leg 105, and thus enables the sleeve to be pivoted counterclockwise relative to lower front leg 105.

When locking ledge section 113 of locking gate link pin 108 has been disengaged from slot 61, and locking gate member 38 has been pivoted counterclockwise towards the interior of carabiner connector ring 35 on lower pivot pin 106, as shown in FIG. 14, an opening 101 is formed below the lower end 102 of the downwardly curved end of upper front leg 54 of the carabiner ring. This enables the hook-like curved lower end of upper front leg 54 to be inserted into an eye of an anchoring bolt, or hooked around the leg of an anchoring J-hook or rebar.

After engaging an anchoring support member such as a bolt eye, hook, or rebar with front upper leg 54 of carabiner connector ring 35, the carabiner connector ring 35 is closed and locked by first pivoting the locking gate member 38 clockwise into axial alignment with the front upper and lower carabiner connector ring legs 54 and 105, as shown in FIGS. 14 and 12. Then pivotal motion is followed by a counterclockwise twisting motion of the locking gate member sleeve 37 about its longitudinal axis to thus mutually engage the locking gate ledge section 113 of the locking gate link pin 108 within locking slot 61 of upper front leg 54 as shown in FIGS. 11, 9, and 7. The pivoting and twisting motions are facilitated by pivot and torque springs (not shown).

As shown in FIGS. 3A-6, carabiner connector ring 35 of SRL apparatus 22 is modified from a prior art carabiner connector J of the type shown in FIGS. 1 and 2 by the addition of a cylindrical bushing 36 which fits coaxially over the outer rotatable sleeve 107 of a cylindrical locking gate 38 of the carabiner connector ring 35. Bushing 36 is fastened to sleeve 107 of cylindrical locking gate 38 by a machined slot and lug, and secured by a socket screw 38A, as shown in FIG. 12.

Referring still to FIGS. 3A-6, it may be seen that bushing 36 of SRL attachment device 21 has protruding radially outwardly from the outer cylindrical wall surface 39 of the bushing a transversely disposed release cable connector pin 40. Release cable connector pin 40 has through its diameter a transversely disposed hole 41 located near the outer transverse end wall 42 of the pin. Hole 41 receives and has secured therein the upper end of a flexible release cable 43.

As may be seen best by referring to FIG. 4, release cable 43 is disposed downwardly and rearwardly from cable connector pin 40 through a guide tube 45 that is fastened to a first side wall 44 of saddle block 29. As shown in FIG. 6, guide tube 45 has an upper opening 47 and a lower opening 48, and is angled downward and rearwardly with respect to cable connector pin 40.

As is shown in FIGS. 3A-4, release cable 43 extends downwards from lower opening 48 of guide tube 45, and thence downwardly through a first, upper guide eye 49 which protrudes radially outwardly from the upper pivotable tubular end leg 26 of support pole 23, near the lower end of the pivotable end leg. A lower segment of release cable 43 is disposed downwardly along a side of the support pole 23 through a lower guide eye 46, located near the lower end 50 of the support pole. The lower end of release cable 43 is optionally terminated by a pull handle, or preferably, wound around a pulley 51.

FIGS. 6-16 show how carabiner connector ring 35 of SRL apparatus 22 is remotely openable by device 21 from a locked configuration, shown in FIG. 6, to an unlocked position, shown in FIGS. 15 and 16.

As shown in FIGS. 9 and 10, a first step in unlocking carabiner connector ring 35 of SRL apparatus 22 entails exerting a downward tension on the lower end of release cable 43 of device 21, as by pulling downward on the lower end of the release cable, or by rotating pulley 51, on which release cable 43 is wound in a first direction. Cable 43 is tensioned sufficiently to rotate bushing 36 and cylindrical locking gate 38 of carabiner ring 35 90 degrees clockwise to an unlocked position, as viewed from above the carabiner ring.

Next, as shown in FIGS. 14 and 15, additional tension exerted on the lower end of cable 43 causes the gate link pin 108 of carabiner ring 35 to pivot counterclockwise towards the interior of the carabiner ring. This in turn causes the formation of a gap 101 between the lower end of upper front leg 54 and the upper end of gate link pin 108 of carabiner connector ring 35, allowing front upper leg 54 of the carabiner connector ring to be inserted into a ring-shaped anchoring member, such as the eye of an eye-bolt, or hooked around a length of rebar or other such anchoring member.

When pulley 51 is rotated in a reverse direction to release tension in cable 43, a pivot spring in carabiner connector ring 35 causes the locking gate 38 of the carabiner connector ring to pivot outwards (clockwise in FIGS. 15, 14, 12, 11, 9) from the interior of the ring into axial alignment with front upper leg 54 of the carabiner connector ring, as shown in the sequence of FIGS. 15 through 9. Then, as shown in the sequence of FIGS. 8 through 6, the locking gate 38 rotates under spring tension provided by a torque spring about the longitudinal axis of the locking gate member to thus lockingly engage the front upper leg of the carabiner locking ring.

As shown in FIGS. 3A-5, remotely operable attachment device 21 of apparatus 20 preferably includes a tie-down cord 70 which is secured through the eye 76 of an end cap 72 attached to the lower end of support pole 23. Tie-down cord 70 is used to immobilize the lower end of support pole 23 after the carabiner connector ring 35 has been secured to an anchoring member such as an eye-bolt or rebar.

As shown in FIG. 3A, a free end of tie-down cord 70 is desirably secured to support pole 23 when apparatus 20 is being stored or transported to a work site. As shown in FIG. 3A, this securement is conveniently accomplished by fastening a distal end of the tie down cord to a flat, disk shaped magnet 74, which is in turn magnetically attached to a ferrous end cap 75 on the upper end of support pole 23.

Figure 17:
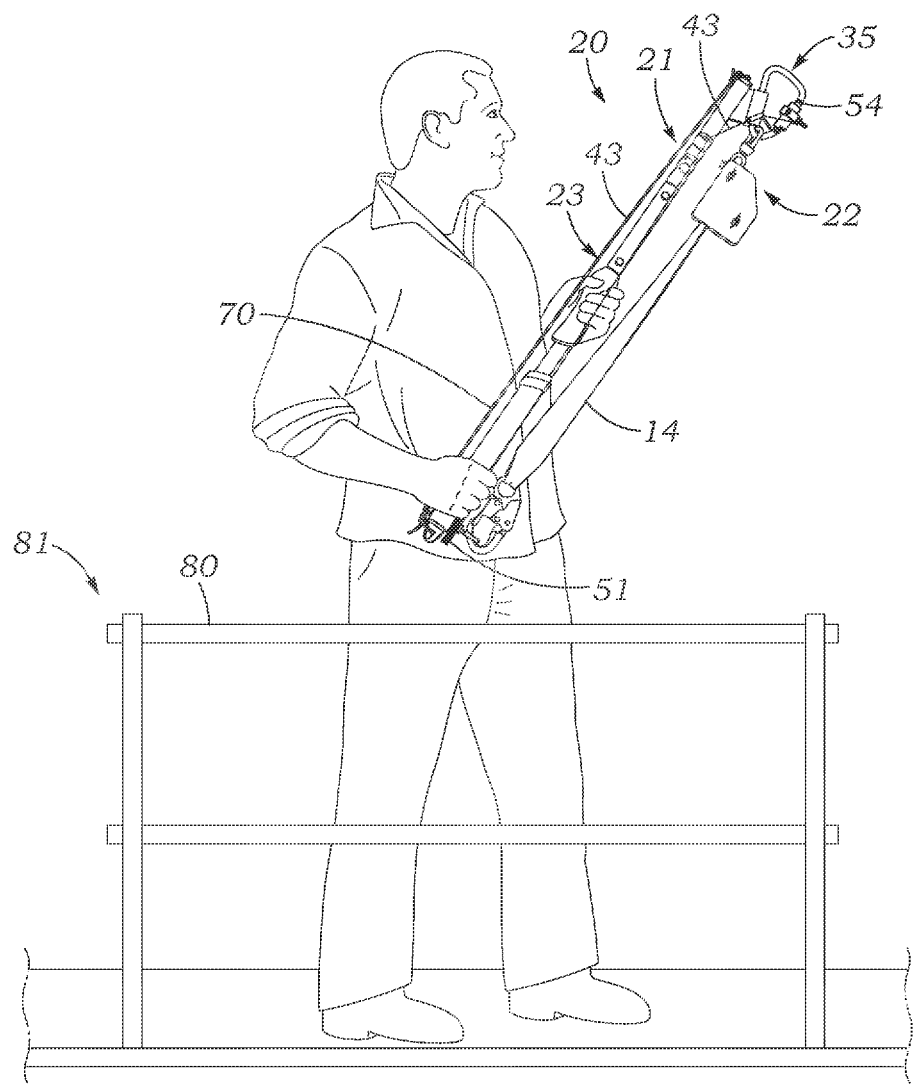
FIG. 17 is a perspective view of the apparatus of FIGS. 3A-6, showing a first step in attaching the apparatus to an eye-bolt.
Figure 18:
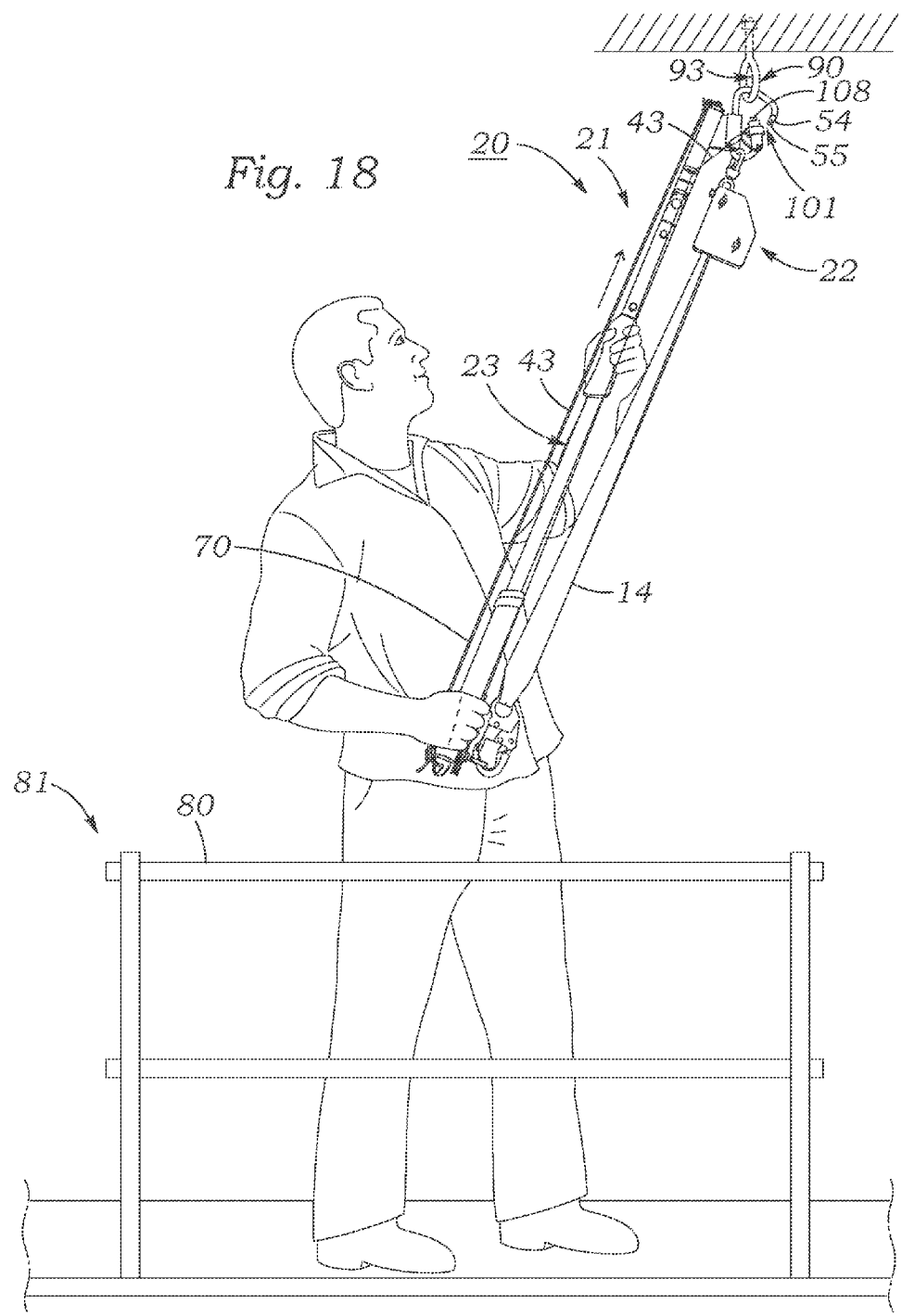
FIG. 18 is a perspective view showing a second step in attaching the apparatus to an eye-bolt.

FIGS. 17 and 18 illustrate how apparatus 20 is used to secure carabiner anchoring connector ring 35 to an anchoring member such as an eye-bolt 90 which protrudes from a beam 91 of a building. As shown in FIGS. 17 and 18, support pole 23 of apparatus 20 is used to extend carabiner connector ring 35 upwards in proximity to the vicinity of eye-bolt 90. Then, as shown in FIG. 18, a downward tension is exerted on the lower end of cable 43, as, for example, by rotating pulley 51. As explained above, such tensioning causes a gap to be opened between the lower end of the upper front leg 54 and locking gate link pin 108 of carabiner locking ring 35. The gap frees up the lower end of upper front carabiner locking ring leg 54 from any obstructions, thus enabling the front upper leg to be inserted into the eye 93 of eye-bolt 90.

After carabiner locking ring 35 has thus engaged eye-bolt 90, tension in cable 43 is released. As has been explained above, such tension release enables springs within the carabiner locking ring 35 to pivot and twist locking gate member 38 into a closed, locking configuration, thus securing the carabiner locking ring to the eye-bolt. Tie down cord 70 may then be tied to a lower anchoring point, such as a railing member 80 of a scaffold 81. Safety belt 14 of the SRL device 22 may then be secured to a workman's body harness, in a conventional fashion.

What is claimed is:

1. A remotely operable attachment device for attaching a self-retracting lanyard (SRL) apparatus of the type which includes a housing, an anchoring connector ring that protrudes upwardly from the housing, a safety line which is retractably extendible from the housing, a swivel connector attached to an outer end of the lifeline for releasable attachment to a body harness securable to a workman, the anchoring connector ring having a locking gate mechanism operable to configure the anchoring connector ring to an open position, in which the anchoring connector ring may be hooked to an anchoring support member, and operable to close the anchoring connector ring and restoring the locking mechanism to a locked position, said attachment device comprising:
  a. an elongated pole having a lower section and an upper end section,
  b. a support clamp fastened to said upper end section of said pole for attachment to an anchoring connector ring of an SRL apparatus,
  c. a flexible cable,
  d. a fitting fixed to a distal end of said cable for attachment to a locking mechanism of an anchoring connector ring of an SRL apparatus,
  e. a guide tube fixedly attached to said pole, said guide tube having an upper entrance opening for an upper section of said flexible cable and a lower entrance opening for deploying a lower section of said flexible cable downwards along said elongated pole,
  f. said upper end section of said pole being pivotably attached to said lower section of said pole and adjustable to selected fixed inclination angles relative to said lower section of said pole, and
  g. whereby tension exerted on a lower, proximal end of said cable is effective in opening a locking gate mechanism of an SRL apparatus anchoring connector ring and release of tension in said cable is effective in closing a locking gate mechanism of the SRL device.

2. The attachment device of claim 1 wherein said fitting for attachment to a locking mechanism of an SRL apparatus is further defined as a bushing for fixedly attaching to a rotatable locking gate member of an SRL apparatus.

3. The attachment device of claim 2 wherein a longitudinal bore in said guide tube is angled downwardly and rearwardly from said upper entrance opening thereof, whereby downward tension in said flexible cable is effective in exerting both a twisting torque about an upright rotation axis of an SRL gate member to which said fitting is attached, and a pivoting torque about a transverse pivot axis perpendicular to and spaced longitudinally from an attachment point of said cable to said bushing.

4. The attachment device of claim 1 wherein said pole has a telescopically adjustable length.

5. The attachment device of claim 1 wherein said pole is further defined as having said upper cable guide attached to an upper section of said pole for slidably supporting said cable guide.

6. The attachment device of claim 5 further including a lower cable guide attached to said lower section of said pole for slidably supporting said cable.

7. The attachment device of claim 1 wherein said support clamp for attachment to an anchoring connector of an SRL apparatus is further defined as including a saddle block having in an outer face thereof an elongated slot for receiving an elongated rear leg of an SRL anchoring connector ring, and at least one fastener for securing to said saddle block said rear leg of said SRL anchoring connector ring in said slot.

8. A remotely operable attachment device for a self-retracting lanyard apparatus of the type which includes a carabiner connector ring, said attachment device comprising:
  a. an elongated support pole having a lower section and an upper end section, b. a support clamp fastened to said upper end section of said pole for attachment to an anchoring connector ring of an SRL apparatus,
c. a guide structure fixedly attached to said support pole, said guide structure having an outer, upper opening proximate said support clamp and a lower, inner opening proximate said support pole,
d. a collar bushing attachable coaxially over a cylindrical rotatable sleeve of a locking gate member of a carabineer connector ring,
e. a flexible cable attached at an upper end thereof to a pin which protrudes radially outwards from said collar bushing, said cable having an upper section disposed through said upper opening of said guide structure and a lower section disposed downwards through said lower opening of said guide structure and along said pole,
f. said upper end section of said pole being pivotably attached to said lower section of said pole and adjustable to selected fixed inclination angles relative to said lower section of said pole, and
g. whereby downward translation of said cable a first distance in response to tension exerted on a lower end section of said flexible cable is effective in rotating a locking sleeve of a locking gate member of a carabineer connector ring to which said collar bushing is attached from a locked to an unlocked position, and downward translation of said cable an additional distance in response to downward tension on said cable is effective in pivoting an unlocked carabineer locking gate member inwardly to an open position.

9. The attachment device of claim 8 wherein said support clamp is further defined as including a grooved member having in an outer face thereon a groove for receiving a rear leg of a carabineer connector ring, and at least a first fastener for fixedly holding the rear leg in said groove.

10. The attachment device of claim 9 wherein said guide structure is further defined as comprising a guide tube fastened to a side of said support clamp, said guide tube having disposed through its length a bore hole having said upper opening and said lower opening.

* * * * *